United States Patent Office 3,385,604
Patented May 28, 1968

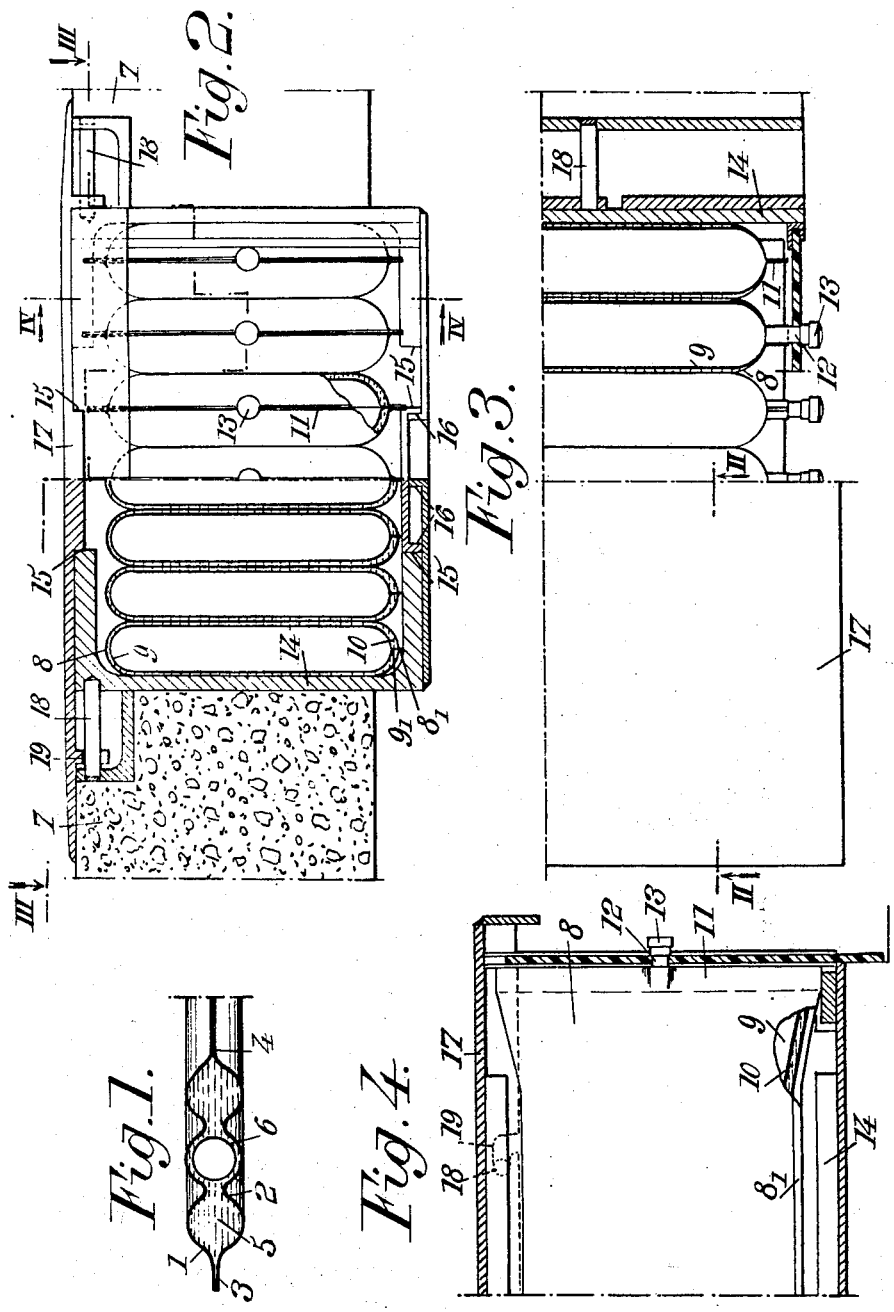

3,385,604
RESILIENTLY COMPRESSIBLE PACKING JOINTS
Daniel Traufler, 48 Ave. Egle, 78 Maisons-Laffitte, France
Filed Mar. 22, 1966, Ser. No. 536,455
Claims priority, application France, Sept. 9, 1965, 30,960
6 Claims. (Cl. 277—26)

The present invention relates to resiliently compressible packing joints intended to be interposed between two parts, in order either resiliently to absorb the compression stresses produced by the movements of said two parts toward each other, in particular so as to ensure fluidtightness between them, as it is the case with annular packing joints used in some pipe connections, or resiliently to produce compression stresses between said parts tending to move them away from each other, as it is the case with expansion joints interposed between the flags or slabs of concrete roads or the like.

The chief object of the present invention is to provide packing joints of this type which are better adapted to meet the requirements of practice, in particular concerning improvements in their behaviour or simplification of construction.

The joints in question comprise a resiliently flexible fluidtight metal envelope filled with liquid and the present invention consists in providing in this liquid a second fluidtight envelope at least partly filled with a gas in such manner that the variations of the internal volume of the first envelope produce variations of the internal volume of said second envelope, which last mentioned variations are possible and are resiliently reversible owing to the compressibility of said gas.

Preferred embodiments of the present invention will be hereinafter described with reference to the appended drawings, given merely by way of example, and in which:

FIG. 1 is a part sectional view of an annular packing joint made according to the present invention;

FIG. 2 shows an expansion joint for a road made according to the present invention, the left hand side of FIG. 2 being a vertical section on the line II—II of FIG. 3, in the state of maximum compression, whereas the right hand side of said FIG. 2 is an elevational view, with parts cut away, in the state of maximum expansion;

FIG. 3 is a horizontal section on the line III—III of FIG. 2; and

FIG. 4 is a vertical section on the line IV—IV of FIG. 2.

First it will be reminded that it is known to constitute a packing joint of the kind with which the present invention is concerned by a resiliently flexible fluidtight metallic envelope filled with liquid, whether this joint is intended to be interposed between two parts applied toward each other, or is intended to exert compression stresses on parts between which it is interposed, for instance horizontal compression stresses on concrete slabs.

FIG. 1 relates to the case of a packing joint between two parts urged against each other.

This packing joint is of the kind constituted by a ring interposed between two flanges to be connected together in a fluidtight manner.

In known joints of this kind, the shape of the ring is such that it can be deformed without modification of its internal volume. When the flanges are urged axially toward each other, the incompressible liquid, the total volume of which is constant, is subjected to the deformations due to crushing and in turn transversely deforms the joints. These deformations are resilient due to the nature and the shape of the metallic envelope, whereby the joint returns to its initial shape as soon as the tightening action exerted by the flanges ceases.

Such packing joints were described in the French Patent No. 1,284,524, filed Apr. 6, 1959, and delivered Jan. 8, 1962, and in the first addition to this patent, No. 81,078, filed Jan. 24, 1962, and delivered June 17, 1963.

As a rule, such joints are satisfactory, but in some cases the deformability of the metallic envelope is not sufficient to compensate wholly for the tendency to contraction of the volume available for the liquid on the inside of said envelope when the joint is subjected to crushing. Or on the contrary, which is equivalent thereto, it is the volume of the liquid that tends to increase more than the volume available for it on the inside of the envelope, in particular as a consequence of a rise of the temperature. As a matter of fact if the pipe connection on which the packing joint is fitted contains a liquid at very high temperature, the expansion of the liquid contained in the envelope may exceed the capacities of resilient deformation of the walls of this envelope the thermal expansion coefficient of which is lower.

According to the present invention, in order to obviate this drawback, there is provided on the inside of said envelope another resiliently flexible closed envelope containing a gas.

It will be readily understood that the resilient deformations of this internal envelope are relatively easy due to the compressible nature of the gas present therein. Such deformations create the supplementary volume that is temporarily necessary for the liquid and automatically cancel this supplementary volume as soon as it has ceased to be necessary, thus preventing the formation of cavities empty with liquid between the two envelopes.

FIG. 1 shows an annular packing joint according to the invention made of two identical half shells 1 and 2, of wave-shaped profile, welded against each other along flanges 3 and 4. This packing joint is filled with a liquid 5 in which is immersed a tore-shaped envelope 6 itself filled with a gas under pressure, such for instance as nitrogen.

Envelope 6 is for instance made of stainless steel and its wall is very thin (ranging preferably from 0.1 to 0.2 mm.) whereas the thickness of the walls of half shells 1 and 2 (which may be made of any suitable metal or alloy as indicated in particular in the above mentioned French addition patent) ranges from 0.5 to 0.8 mm.

It should be noted that the pressure is substantially the same on either side of the wall of envelope 6, which excludes risks of evacuation of the gas by diffusion through this wall, as it would be the case for a gas or vapor directly in contact with half shells 1 and 2.

Furthermore, due to the fact that liquid 5 wholly surrounds envelope 6, or at least most of it, the pressure exerted by this liquid on half shells 1 and 2 is the same at all points, which avoids the formation of weak areas in this joint and therefore their crushing.

The expansion joints of the prior type above mentioned, interposed between contiguous concrete slabs, are arranged in such manner as resiliently to withstand the thermal deformations undergone by these slabs and to exert thereon horizontal compression stresses intended to ensure cohesion thereof.

In these joints, the relative crushing of the liquid filled envelope must be very important in some circumstances and it frequently occurs that mere deformations by bending thereof are not sufficient by themselves permanently to ensure for the liquid a sufficiently great but never excessive housing.

In order to increase the possibility of reversible crushing of this envelope the latter might be made to communicate with an expansion chamber capable of resiliently compensating for possible variations of the internal volume of said envelope due to deformation of the slabs.

But in order to obtain such a communication it would be necessary to provide a system of pipes and connections.

According to the present invention the necessity of such pipes and connections is avoided by housing on the inside of the liquid filled metallic envelope another envelope containing a gas preferably compressed to a pressure equal to the working pressure of the joint (for instance, from 25 to 35 kgs./cm.$^2$).

In the preferred case, said envelope is resiliently flexible and its internal volume is wholly separate from the liquid that surrounds it.

In such a case, as precedingly, the differences between the volume of liquid and the volume available for said liquid on the inside of the external envelope which are too important are absorbed by resilient deformation of the internal envelope, the contents of which is compressible.

The active areas of the external envelope (that is to say the areas that transmit or support the pressure) are separated from the corresponding internal envelope portion by a layer of liquid, which ensures a homogeneous distribution of the pressure over the whole of said areas.

FIGS. 2 to 4 inclusive show such an expansion joint interposed between two concrete slabs 7, this joint being essentially made of seven cells juxtaposed side by side.

Each of these cells comprises:

(a) An external metallic envelope 8 having the general shape of a cylinder the generatrices of which are horizontal and the directrix of which is made of two opposed half circles joined together by vertical straight lines;

(b) An internal envelope 9 similar to envelope 8 but of course smaller than it, disposed on the inside thereof in such manner that the walls of the two envelopes are at least substantially parallel to, and at a distance $d$ from, each other, this distance being substantially the same at all points (the distance between the two envelopes being, for instance, maintained by means of ribs or grooves provided toward the inside on the external envelope 8);

(c) A liquid 10 filling the space between these two envelopes; and (d) A compressed gas filling the internal envelope.

Each of the cells of such a joint works as follows: When the joint is crushed, the volume reserved for the liquid tends to decrease. As this liquid is not compressible it tends to expand the external envelope which is possible only to a limited degree since the metal cannot be stretched. The difference between the constant volume of liquid and the volume that is necessary is obtained by compression of the internal envelope.

Owing to the resiliency thereof and of its contents, said internal envelope expands again automatically as soon as the volume available for the liquid again increases due to the contraction of the slabs.

Thus, the advantages of metallic joints filled with liquid (strength, efficiency, long life, moderate cost) are obtained without involving the drawbacks that used to be associated therewith (small amplitude of the reversible crushing) and this without external pipes and cumbersome connections, costly to be manufactured, to be placed in position and to be kept in working order.

FIGS. 2 and 4 show the structure of envelopes 8 and 9. Each of them is made of a metal sheet bent upon itself and welded along a longitudinal edge ($8_1$, $9_1$) each end of a tube being pinched and welded along a vertical flat area 11. In the middle of this edge 11 there is fitted a tubular element 12 forming a communication between the inside of internal envelope 9 and the outside. The gas under pressure (for instance nitrogen) is introduced through this connection 12 into envelope 9. A suitable plug 13 serves to close the connection when the envelope has been charged with gas.

Liquid is introduced in a manner known in itself, for instance through a ball valve (not shown) welded to the base of the cell when the edge $8_1$ thereof is welded.

In the embodiments of FIGS. 2 to 4, the cells are housed in a deformable metallic casing 14 fitted with abutments 15 and 16 to limit the horizontal contractions and expansions, respectively, of this casing.

A plate 17 having a suitable profile forms a cover for casing 14 and ensures continuity of the running path between two slabs 7. The horizontal deformations of the casing with respect to this plate are guided by means of rods 18 rigid with the casing and cooperating with lugs 19 rigid with the plate.

By way of example, in a joint as illustrated by FIGS. 2 to 4 and serving to connect together concrete slabs of a length equal to 100 m. and of a thickness equal to 15 cm., the pressure exerted by the joint being to vary from 23 to 27 kgs./cm.$^2$ during the operation, each of the seven cells may be constituted by steel leaves, in particular made of spring steel, having a thickness of the order of 1 mm., the horizontal thickness of every cell being of about 30 mm. and varying by about 5–10 mm. during the operation, its height being of the order of 150 mm. and the thickness of the liquid sheet (oil or any antifreezing mixture) interposed between the two envelopes being of about from 1 to 2 mm.

The internal envelope might be provided with one or several openings forming a communication between the inside of said internal envelope and the liquid that surrounds it, said liquid however covering always the top surface of said envelope (which therefore remains always wholly immersed therein), a volume compensation taking place in this case at least partly by inflow and outflow of liquid into or out from the internal envelope, which, in this case, might be rigid.

The internal envelope might also be made of a material other than metallic, for instance of rubber or another elastomer or plastic material either reinforced with wires, networks or grids of metal, glace or another suitable material, or not.

In a general manner, while the above description discloses what are deemed to be practical and efficient embodiments of the present invention, said invention is not limited thereto as there might be changes made in the arrangement, disposition and form of the parts without departing from the principle of the invention as comprehended within the scope of the appended claims.

What I claim is:

1. A resiliently compressible packing joint which comprises, in combination,
   a resiliently flexible fluidtight metallic envelope filled with a liquid, and
   a second fluidtight envelope containing a gas, said second envelope being located in the first one, whereby variations of the volume limited by the first envelope produce variations of the volume of said second envelope, these last mentioned variations being made possible and being resiliently reversible owing to the compressibility of said gas.

2. A joint according to claim 1 wherein said gas is at a pressure higher than atmospheric pressure.

3. A joint according to claim 1 wherein said second envelope is resiliently flexible.

4. A joint according to claim 1 wherein said second envelope is metallic.

5. A joint according to claim 1 wherein said second envelope is closed and fluidtight.

6. A joint according to claim 1 wherein said second envelope is of the same shape as the first one and separated therefrom by a thin layer of uniform thickness of liquid.

References Cited

UNITED STATES PATENTS

| | | | |
|---|---|---|---|
| 3,007,600 | 11/1961 | Horner | 277—26 X |
| 3,147,016 | 9/1964 | Traufler | 277—226 |
| 3,178,779 | 4/1965 | Clark et al. | 277—34 X |

SAMUEL ROTHBERG, *Primary Examiner.*